(12) United States Patent
McGrory et al.

(10) Patent No.: US 8,352,486 B1
(45) Date of Patent: Jan. 8, 2013

(54) BUILT-IN-TEST QUICK VIEW TOOL

(75) Inventors: Matthew J. McGrory, St. Louis, MO (US); Edward M. Parmenter, St. Peters, MO (US); Douglas W. Reeves, Maryland Heights, MO (US); Russell C. Waltz, Florissant, MO (US); Darrell O. Bartz, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 370 days.

(21) Appl. No.: 12/489,704

(22) Filed: Jun. 23, 2009

(51) Int. Cl.
*G06F 7/00* (2006.01)
*G06F 17/30* (2006.01)
*G06F 13/14* (2006.01)
(52) U.S. Cl. ......... 707/765; 707/705; 707/758; 707/759
(58) Field of Classification Search ....... 707/999.001–4, 707/999.009, 999.1, 999.104, 999.107, 610, 707/758, 759, 765; 701/1–2, 29; 714/733; 717/106; 345/619; 705/1.1
See application file for complete search history.

(56) References Cited

U.S. PATENT DOCUMENTS

| 7,203,879 | B2 | 4/2007 | Shabib et al. |
| 7,983,809 | B2* | 7/2011 | Kell et al. ................. 701/29.3 |
| 2005/0283694 | A1* | 12/2005 | Shabib et al. ............... 714/733 |

OTHER PUBLICATIONS

"NI LabVIEW", National Instruments, pp. 1-3 retrieved Jun. 12, 2009 http://www.ni.com/labview/.

* cited by examiner

*Primary Examiner* — Greta Robinson
*Assistant Examiner* — Cecile Vo
(74) *Attorney, Agent, or Firm* — Yee & Associates, P.C.

(57) ABSTRACT

The different advantageous embodiments provide an apparatus that comprises a number of data storage units, a data extraction tool, a data warehouse, and a data processing system. The data extraction tool is configured to extract data from the number of data storage units. The data warehouse has a number of data files comprising the data extracted from the number of data storage units. The data processing system is configured to process selected data for a number of selected systems from the number of data files.

20 Claims, 13 Drawing Sheets

BUILT-IN-TEST QUICK VIEW TOOL

This invention was made with Government support under N00019-04-C-0005 awarded by the United States Navy. The Government has certain rights in this invention.

BACKGROUND INFORMATION

1. Field

The present disclosure relates generally to system diagnostic designs and more specifically to built-in-test diagnostics and analysis.

2. Background

Diagnostic designs, known collectively as built-in-test (BIT), consist of hardware circuits and software code that are designed as a series of automated tests used to sense when a system performance parameter has exceeded some preset limits.

BIT data and recorded parameters are often provided by the diagnostic design. However, due to the volume of data, format of data, or BIT design, the analysis of the BIT data may be time consuming or difficult because of the need to interpret the data or make the data understandable. Furthermore, other data of interest may need to be identified and used with the BIT data to identify and isolate the cause of a particular system condition.

For example, diagnostic systems utilize information captured during system operation in a data storage unit. This information is captured in the form of a hexadecimal data file. The data file captured may contain a multitude of recorded parameters in addition to the built-in-test data for components in the system of interest. Manual analysis of this file may be difficult due to the size and format of the hexadecimal file. Manual analysis is further complicated by the need to interpret which portions of the hexadecimal file represent built-in-test data and additional data of interest as opposed to other data which is not useful for diagnostic analysis. Current methods of data extraction are tedious, and require multiple steps by the human analyst before the information is in a form suitable for analysis. The current methods may also require manually referencing the system schematics and subsequent operational data interpretation to evaluate the health of the system.

SUMMARY

The different advantageous embodiments provide an apparatus that comprises a number of data storage units, a data extraction tool, a data warehouse, and a data processing system. The data extraction tool is configured to extract data from the number of data storage units. The data warehouse has a number of data files comprising the data extracted from the number of data storage units. The data processing system is configured to process selected data for a number of selected systems from the number of data files.

The different advantageous embodiments may further provide a method for accessing built-in-test data. A selection of a target system from a number of systems is received. A selection of a number of data files stored in a data warehouse is received. Selected information is processed from the number of data files using a processor unit. The selected information is presented using a user interface.

The different advantageous embodiments may further provide a computer program product stored on a computer readable storage medium having computer usable program code for accessing built-in-test data. The computer usable program code is configured to perform the steps of receiving a selection of a target system from a number of systems, receiving a selection of a number of data files stored in a data warehouse, processing selected information from the number of data files using a processor unit, and presenting the selected information using a user interface.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
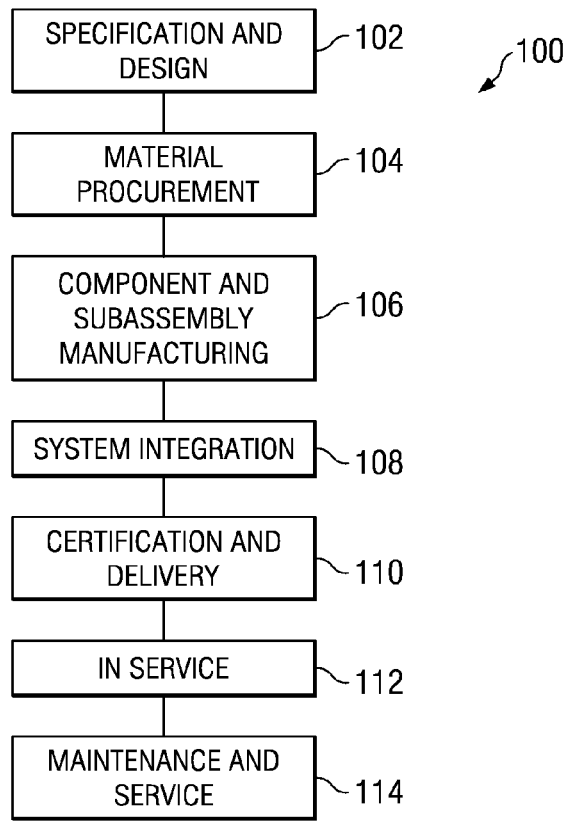
FIG. 1 is an illustration of an aircraft manufacturing and service method in accordance with an advantageous embodiment.
Figure 2:
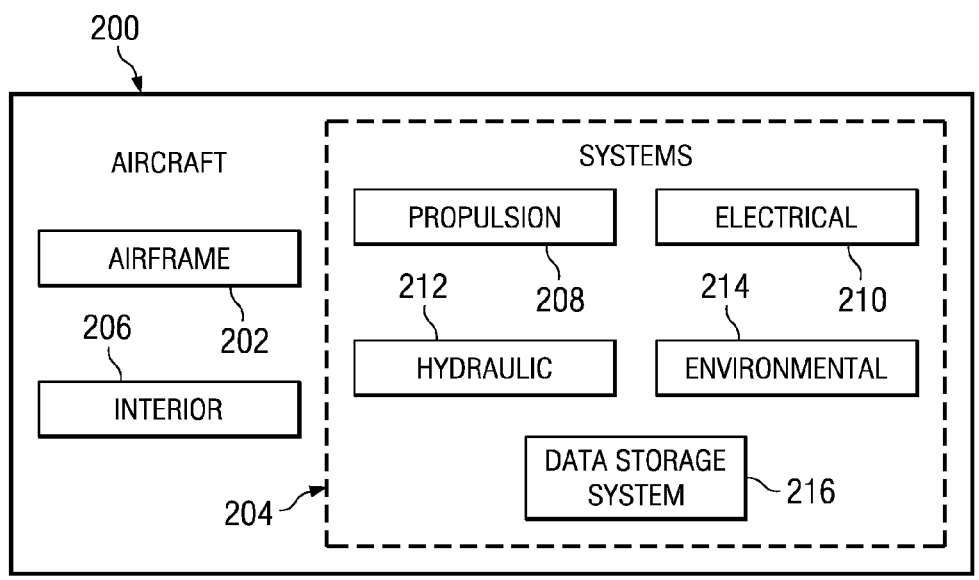
FIG. 2 is illustration of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 may take place. Thereafter, aircraft 200 in FIG. 2 may go through certification and delivery 110 in order to be placed in service 112. While in service by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 may be produced by aircraft manufacturing and service method 100 in FIG. 1 and may include airframe 202 with a plurality of systems 204 and interior 206. Examples of systems 204 may include one or more of propulsion system 208, electrical system 210, hydraulic system 212, environmental system 214, and data storage system 216. Any number of other systems may be included. Although an aerospace example is shown, different advantageous embodiments may be applied to other industries, such as the automotive industry. Additionally, different advantageous embodiments may be applied to other infrastructure industries, such as bridges and buildings.

Apparatus and methods embodied herein may be employed during any one or more of the stages of aircraft manufacturing and service method 100 in FIG. 1. For example, components or subassemblies produced in component and subassembly manufacturing 106 in FIG. 1 may undergo diagnostic analysis while aircraft 200 is in maintenance and service 114 in FIG. 1.

Also, one or more apparatus embodiments, method embodiments, or a combination thereof may be utilized during service stages, such as maintenance and service 114 and in service 112 in FIG. 1, for example, without limitation, by substantially expediting the inspection and/or maintenance of aircraft 200.

The different advantageous embodiments take into account and recognize that currently used diagnostic systems may inhibit efficient and rapid detection and isolation of vehicle subsystem components with inconsistencies that may affect the performance and/or function of the vehicle subsystem components. Current methods may require manual analysis of operational data resources captured by the system of interest to supplement the understanding of the mechanism at issue. This manual analysis is time consuming and prone to human error due to the volume of data to be evaluated.

The different advantageous embodiments take into account and further recognize that currently used diagnostic systems conduct cable analysis by manually connecting external test equipment to the wiring interfaces in the aircraft to gather and display this data.

Thus, one or more of the different advantageous embodiments provide an apparatus that comprises a number of data storage units, a data extraction tool, a data warehouse, and a data processing system. The data extraction tool is configured to extract data from the number of data storage units. The data warehouse has a number of data files comprising the data extracted from the number of data storage units. The data processing system is configured to process selected data for a number of selected systems from the number of data files.

The different advantageous embodiments may further provide a method for accessing built-in-test data. A selection of a target system from a number of systems is received. A selection of a number of data files stored in a data warehouse is received. Selected information is processed from the number of data files using a processor unit. The selected information is presented using a user interface.

The different advantageous embodiments may further provide a computer program product stored on a computer readable storage medium having computer usable program code for accessing built-in-test data. The computer usable program code is configured to perform the steps of receiving a selection of a target system from a number of systems, receiving a selection of a number of data files stored in a data warehouse, processing selected information from the number of data files using a processor unit, and presenting the selected information using a user interface.

The different advantageous embodiments provide an efficient and robust system for diagnostic analysis. Information about the target system of interest is provided in a format that is easy to interpret and understand. Troubleshooting can be performed by engineers and technical representatives in addition to analysts. Analysis may be automated to provide detailed reports that may be shared across the internet for consultation at remote locations. This allows factory floor level workers to consult with technical experts at other locations.

The different advantageous embodiments may further provide an application that automates the reading, interpretation, and extraction of data from a system data storage unit data file. The different advantageous embodiments integrate graphic presentation of vehicle built-in-test results with other information to enable rapid diagnostic evaluation of the system of interest. Other information may include information such as parametric data captured during operation of the target system, information contained in system design schematics, and other design information. The different advantageous embodiments also provide the ability to search historical records of operational data to locate specific patterns of information related to a hypothetical scenario.

As a specific illustrative example, one or more of the different advantageous embodiments may be implemented, for example, without limitation, during component and subassembly manufacturing 106, system integration 108, certification and delivery 110, service 112, and maintenance and service 114 in FIG. 1 to assemble a structure for aircraft 200. As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

Figure 3:
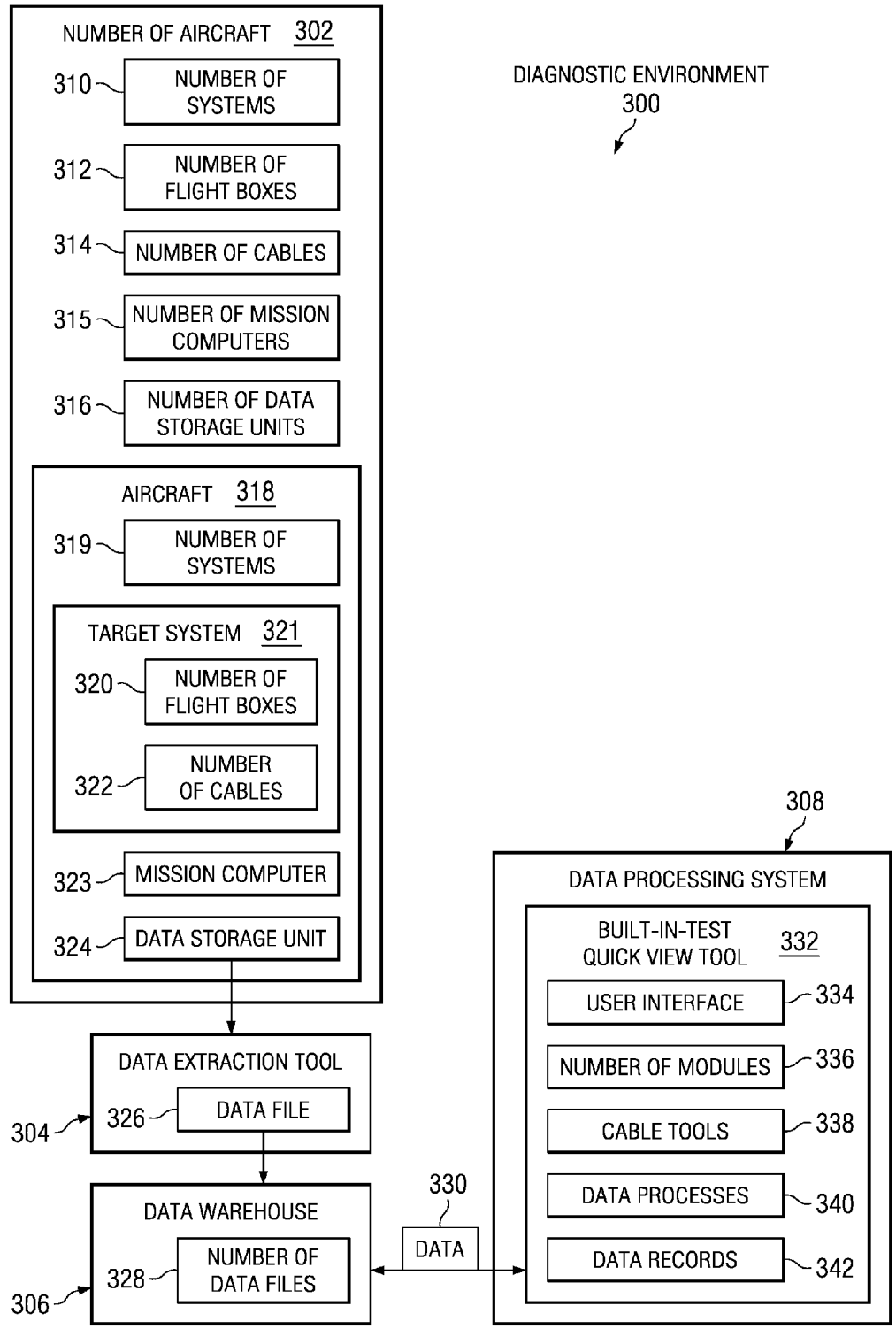
FIG. 3 is an illustration of a diagnostic environment in accordance with an advantageous embodiment.

With reference now to FIG. 3, an illustration of a diagnostic environment is depicted in accordance with an advantageous embodiment. Diagnostic environment 300 may be implemented during component and subassembly manufacturing 106, system integration 108, certification and delivery 110, service 112, and maintenance and service 114 in FIG. 1 to assemble a structure for aircraft 200, for example.

Diagnostic environment 300 may be an environment where component inconsistencies are identified and addressed. Inconsistencies may refer to, for example, without limitation, operating out of tolerance, operating at a level below desired performance level, not operating within tolerance, not operating at a desired performance level, partially operating, system performance parameters exceeding preset limits, and/or any other inconsistent operation.

Diagnostic environment 300 may include number of aircraft 302, data extraction tool 304, data warehouse 306, and data processing system 308. Number of aircraft 302 may include number of systems 310. Number of systems 310 may include, without limitation, the systems capable of being analyzed using built-in-test quick view tool 332, such as, without limitation, EA-18G electronic warfare system (ALQ-218), digital memory device (DMD), interference noise cancellation system (INCANS), communications countermeasures system (CCS), electronic attack unit (EAU), and/or any other suitable system. For example, a user may select the electronic warfare system as the system of interest during a particular analysis session.

Number of aircraft 302 may also include number of flight boxes 312, number of cables 314, number of mission computers 315, and number of data storage units 316. Number of flight boxes 312 may be assemblies that contain a number of sub-assemblies and circuits. The number of sub-assemblies and circuits may include a number of built-in-test circuits. In an illustrative example, number of flight boxes 312 may include weapon replaceable assemblies (WRAs). In another illustrative example, number of flight boxes 312 may include line replaceable units (LRUs).

In these examples, number of flight boxes 312 are connected by number of cables 314. Number of cables 314 may be radio frequency (RF) cables. Number of mission computers 315 are the systems that record operational data for number of aircraft 302. Each aircraft in number of aircraft 302 has its own mission computer in number of mission computers 315. Number of mission computers 315 may have a number of versions. In an illustrative example, each aircraft in number of aircraft 302 may have a different version of a mission computer from number of mission computers 315. Number of mission computers 315 record, or write, operational data to number of data storage units 316. Number of data storage units 316 are removable storage units that may be removed from a vehicle and stripped of data by data extraction tool 304. Data extraction tool may be, for example, without limitation, an Aircraft Maintenance Environment tool. Number of data storage units 316 collect operational data from number of mission computers 315 whenever the vehicle associated with the mission computer is on, or receiving power. A vehicle such as an aircraft, for example, may be considered on, or receiving power, either on the ground or during flight. In the illustrative example of an aircraft, each aircraft contains a single data storage unit and mission computer, and a number of flight boxes and cables.

Number of aircraft 302 may include a number of different types of aircraft. As used herein, a number refers to one or more aircraft and/or one or more different types of aircraft. Aircraft 318 may be an example of one individual aircraft in number of aircraft 302. Aircraft 318 includes number of systems 319, target system 321, mission computer 323, and data storage unit 324. Target system 321 may be an example of a target system of interest. Target system 321 may include number of flight boxes 320, and number of cables 322. Data storage unit 324 may collect operational data recorded by mission computer 323 of aircraft 318 whenever aircraft 318 power is applied, both when on the ground and during flight.

Data storage unit 324 may be removed from aircraft 318 and stripped of data by data extraction tool 304 to create data file 326. Data file 326 may then be stored in data warehouse 306 as part of number of data files 328. Data warehouse 306 is a storage system. In these examples, data warehouse 306 may be implemented using any type of data storage device including, for example, without limitation, a memory unit, database, persistent storage, and/or any other suitable type of data storage device.

Data processing system 308 may include built-in-test quick view tool 332. Built-in-test quick view tool 332 may pull data 330 from number of data files 328 in data warehouse 306. Built-in-test quick view tool 332 may include user interface 334, number of modules 336, cable tools 338, data processes 340, and data records 342.

User interface 334 may be a graphical user interface that enables users to interact with other components of built-in-test quick view tool 332, as well as view data 330 pulled from data warehouse 306.

Number of modules 336 are selectable modules that may be selected using user interface 334. Number of modules 336 allows a user to select the information for analysis, the mode in which the information is viewed, and other functionalities of built-in-test quick view tool 332. Cable tools 338 provide capabilities for testing, analyzing, and reporting on interconnections within a vehicle, such as aircraft 318 for example. Data processes 340 provide capabilities for selecting data about the target system of interest, such as target system 321, from data 330 pulled from data warehouse 306. Data records 342 provide detailed information such as, without limitation, built-in-test descriptions, data storage unit record codes, schematics, diagrams, and/or any other suitable information.

In an illustrative example, number of modules 336 in built-in-test quick view tool 332 may be accessed using user interface 334. A selection in number of modules 336 may be made to select target system 321 and initiate data processes 340 to pull data 330 from data warehouse 306. Data 330 may be data from data file 326 stripped from data storage unit 324 by data extraction tool 304. Data storage unit 324 may have recorded operational data during a time period in which aircraft 318 was on or powered up.

In this illustrative example, data 330 may contain information about multiple aspects of operational information for aircraft 318. Data processes 340 may interpret data 330 and select information about the target system of interest based on the selection of the system of interest, such as target system 321 for example. The selected information may be displayed over user interface 334 using number of modules 336. A selection to view the selected information in a specific mode may be made using user interface 334. A selection to view more detailed information may be made using user interface 334, which may initiate data records 342 to present the requested detailed information through number of modules 336 and displayed using user interface 334.

The illustration of diagnostic environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, diagnostic environment 300 may be used to perform analysis of different types of structures in a manner faster than currently available diagnostic systems. A structure may be, for example, aircraft 200 in FIG. 2. In another illustrative example, a structure may be, for example, without limitation, an aircraft, a spacecraft, a submarine, a surface ship, a vehicle, a tank, a building, a manufacturing floor, an engine, and/or some other suitable type of structure. In yet another illustrative example, a structure may be a part of a larger structure. For example, in the illustrative example of an aircraft, a part of a structure may be, for example, without limitation, a wing, fuselage, engine, and/or some other suitable part of an aircraft structure.

Figure 4:
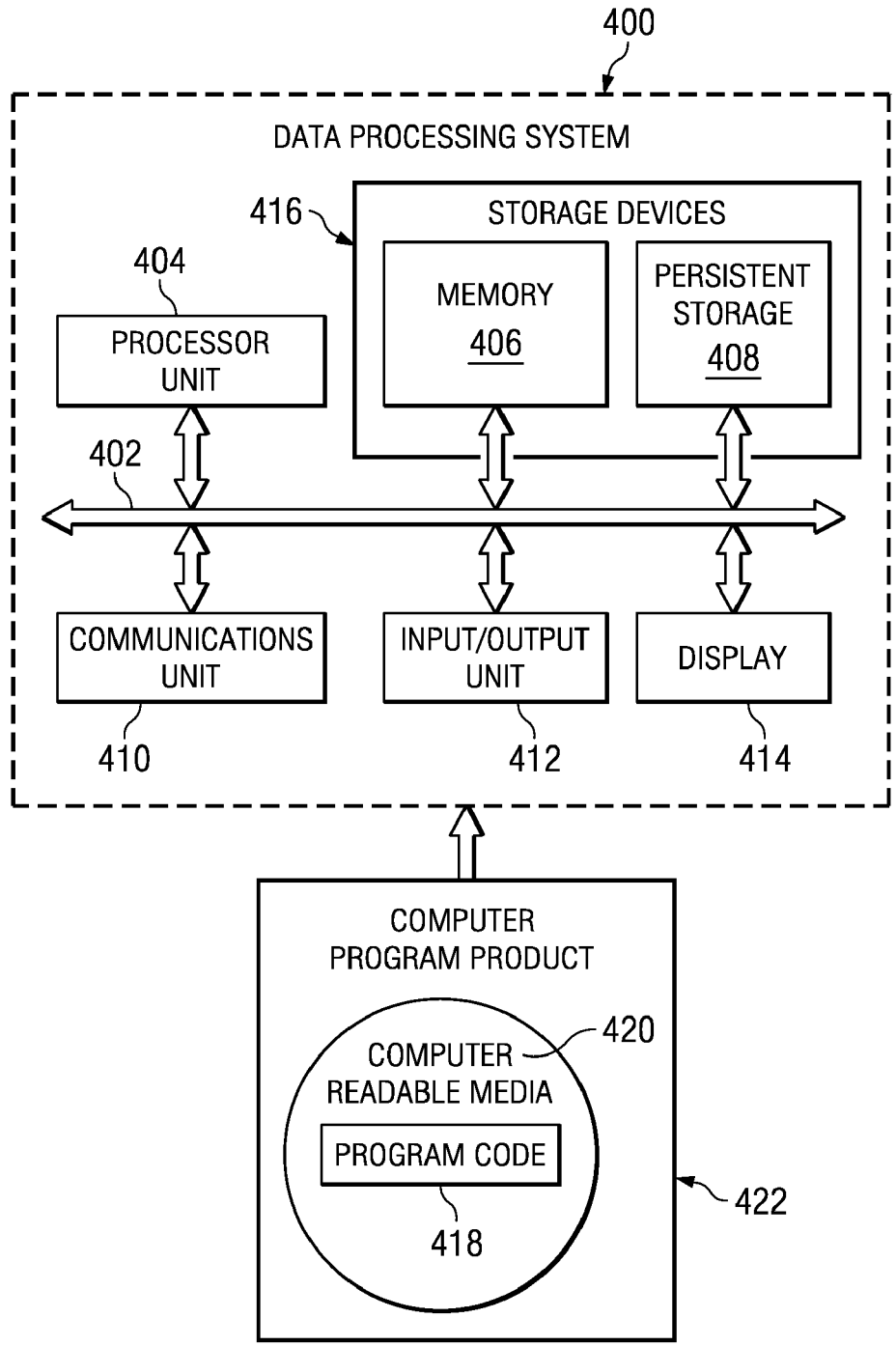
FIG. 4 is an illustration of a data processing system in accordance with an illustrative embodiment.

With reference now to FIG. 4, an illustration of a data processing system is depicted in accordance with an illustrative embodiment. Data processing system 400 may be used to implement different computers and data processing systems within a diagnostic environment, such as diagnostic environment 300 and/or data processing system 308 in FIG. 3.

In this illustrative example, data processing system 400 includes communications fabric 402, which provides communications between processor unit 404, memory 406, persistent storage 408, communications unit 410, input/output (I/O) unit 412, and display 414. Depending on the particular implementation, different architectures and/or configurations of data processing system 400 may be used.

Processor unit 404 serves to execute instructions for software that may be loaded into memory 406. Processor unit 404 may be a set of one or more processors or may be a multiprocessor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device may be any piece of hardware that may be capable of storing information, such as, for example without limitation, data, program code in functional form, and/or other suitable information either on a temporary basis and/or a permanent basis. Memory 406, in these examples, may be, for example, a random access memory or any other suitable volatile or non-volatile storage device. Persistent storage 408 may take various forms depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 may be a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications and/or programs may be located in storage devices 416, which are in communication with processor unit 404 through communications fabric 402. In these illustrative examples the instruction are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code in the different embodiments may be embodied on different physical or tangible computer readable media, such as memory 406 or persistent storage 408.

Program code 418 may be located in a functional form on computer readable media 420 that may be selectively removable and may be loaded onto or transferred to data processing system 400 for execution by processor unit 404. Program code 418 and computer readable media 420 form computer program product 422 in these examples. In one example, computer readable media 420 may be in a tangible form, such as, for example, an optical or magnetic disc that may be inserted or placed into a drive or other device that may be part of persistent storage 408 for transfer onto a storage device, such as a hard drive that may be part of persistent storage 408. In a tangible form, computer readable media 420 also may take the form of a persistent storage, such as a hard drive, a thumb drive, or a flash memory that may be connected to data processing system 400. The tangible form of computer readable media 420 may also be referred to as computer recordable storage media. In some instances, computer readable media 420 may not be removable.

Alternatively, program code 418 may be transferred to data processing system 400 from computer readable media 420 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

In some illustrative embodiments, program code 418 may be downloaded over a network to persistent storage 408 from another device or data processing system for use within data processing system 400. For instance, program code stored in a computer readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 400 may be any hardware apparatus that may store data. Memory 406, persistent storage 408 and computer readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter.

Further, a memory may be, for example, memory 406 or a cache such as found in an interface and memory controller hub that may be present in communications fabric 402.

Figure 5:
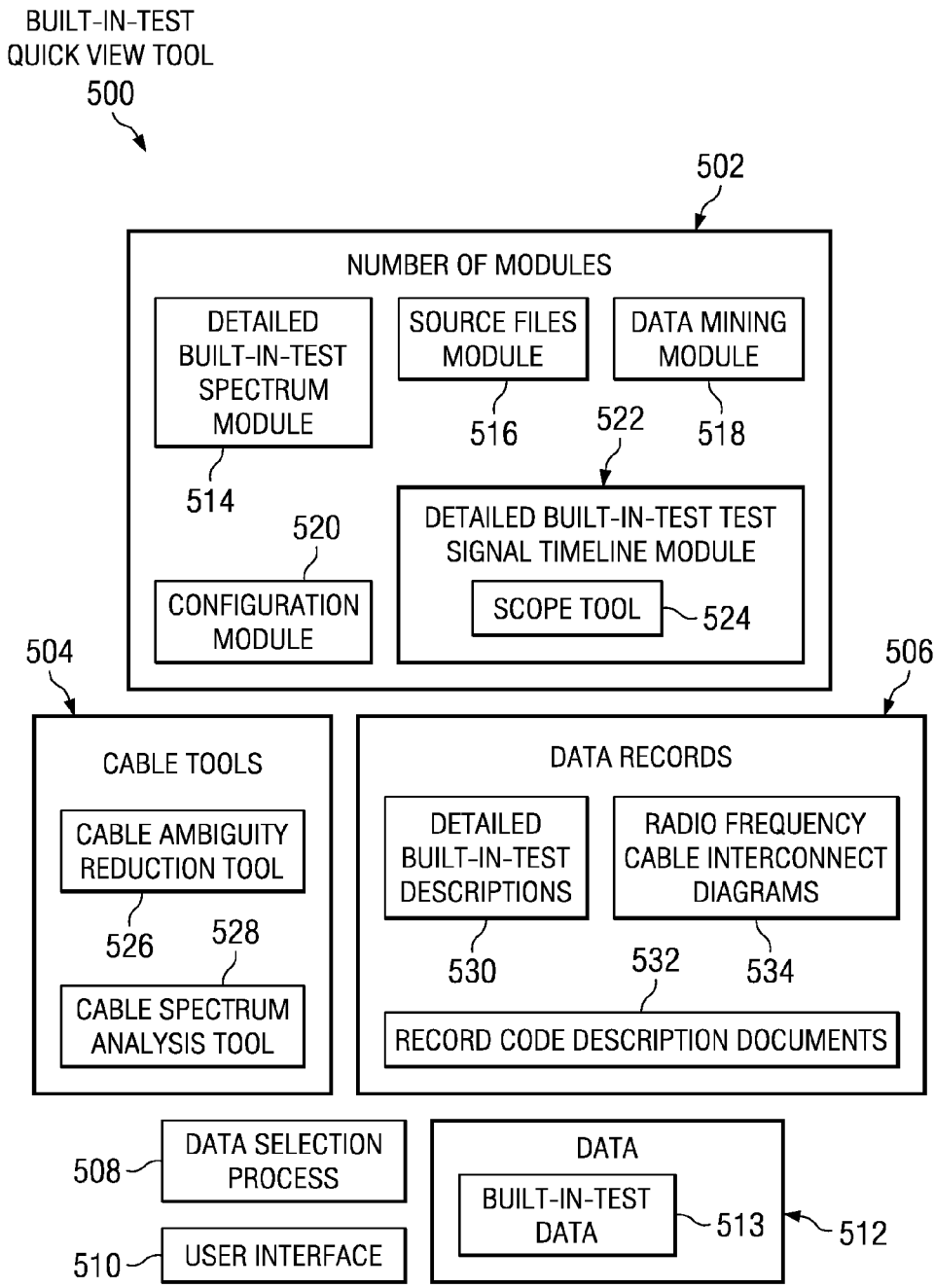
FIG. 5 is an illustration of a built-in-test quick view tool in accordance with an illustrative embodiment.

With reference now to FIG. 5, an illustration of a built-in-test quick view tool is depicted in accordance with an illustrative embodiment. Built-in-test quick view tool 500 may be an example of one implementation of built-in-test quick view tool 332 in FIG. 3.

Built-in-test quick view tool 500 may include number of modules 502, cable tools 504, data records 506, data selection process 508, user interface 510, and data 512. Number of modules 502 may be an example of one implementation of number of modules 336 in FIG. 3. Number of modules 502 may include detailed built-in-test spectrum module 514, source files module 516, data mining module 518, configuration module 520, and detailed built-in-test test signal timeline module 522.

Figure 8:
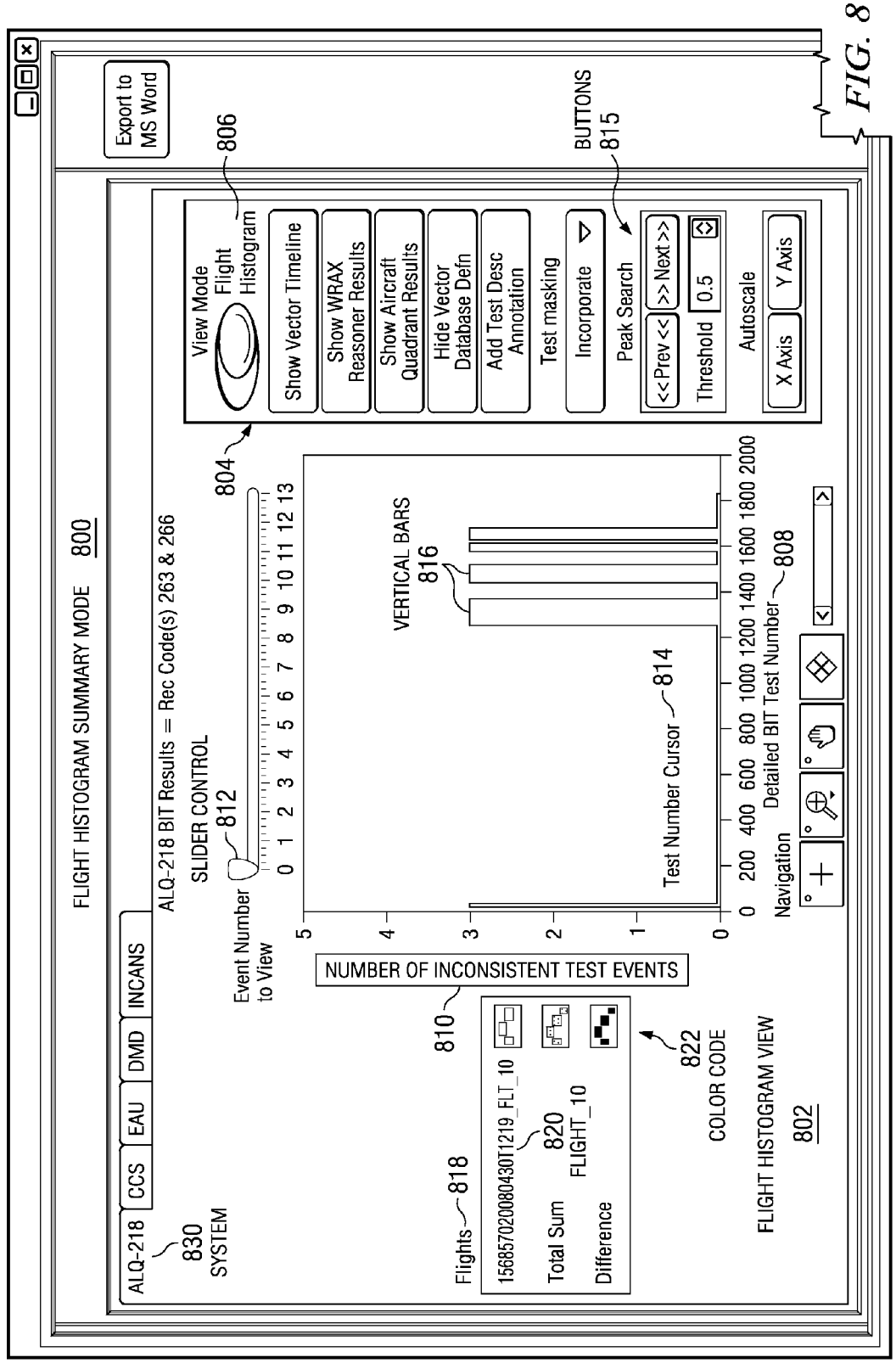
FIG. 8 is an illustration of a flight histogram summary mode in accordance with an illustrative embodiment.

Detailed built-in-test spectrum module 514 provides the main user interface presented when built-in-test quick view tool 500 is initiated. Detailed built-in-test spectrum module 514 provides the primary controls which enable the user to select and modify the primary display of the target system built-in-test results using user interface 510. Detailed built-in-test spectrum module 514 provides the user controls for loading operational data for the target system, such as target system 321 in FIG. 3 for example. Detailed built-in-test spectrum module 514 may also provide the capabilities for presenting the primary graphical display for selected information extracted from data for the target system. This selected information may include the test number and associated quantity of built-in-test inconsistencies that occurred during the flight. Detailed built-in-test spectrum module 514 may also identify, as shown in FIG. 8, the target system of interest (830), the view mode (804), and the target system date-time stamp (820).

Sources files module 516 provides an indication of the path mappings to each of the source files that built-in-test quick view tool 500 uses to perform its functionalities. The path mappings may be initially created by a built-in-test quick view tool installation routine, but may be overridden by a user if desired.

Data mining module 518 provides a mechanism for searching data, or files, to identify an occurrence of a specific data pattern of interest. A user may enter a network path to search and select a record code that may contain the pattern of interest in one or more records, the record name where the pattern might appear, and the number of days for the mining algorithm to search through.

Configuration module 520 extracts configuration data for the target system, such as target system 321 in FIG. 3 for example. Configuration data may be located in the operational data files of the target system, such as data file 326 in FIG. 3 for example. Configuration data may include the name of the file that the currently displayed target data came from, an identifying number for the vehicle which produced the target data, the version number of the software that was loaded on the target vehicle, the version number of the software that was loaded on the target system of interest, the take off time and landing time of the vehicle if the vehicle is an aircraft.

Detailed built-in-test test signal timeline module 522 includes scope tool 524. Scope tool 524 provides for capabilities to observe a user selected time indexed display of discrete signals simultaneously from any of the aircraft systems which log data to a data storage unit, such as data storage unit 324 in FIG. 3. Scope tool 524 provides a graphic display of the time indexed discrete signal transitions, which provides the user with an indication of the relationship of each transition relative to other signal transitions.

Cable tools 504 may include cable ambiguity reduction tool 526 and cable spectrum analysis tool 528. Cable ambiguity reduction tool 526 provides for capabilities to filter a number of cables, such as number of cables 314 in FIG. 3, to determine a minimum sub-set of cables that may have inconsistencies out of the total number of cables throughout the vehicle. Cable ambiguity reduction tool 526 may determine the minimum sub-set of cables by aggregating the set of radio frequency cables that have a built-in-test inconsistency associated with them during a particular flight, then eliminating the cables on the aggregated list that also have a built-in-test passed indication during the same flight. Cable spectrum analysis tool 528 may be used in conjunction with cable ambiguity reduction tool 526 to select a specific, individual cable to analyze and inspect further. Cable spectrum analysis tool 528 may provide information about which spectrum frequencies encountered an inconsistency and at what time or during which event. Spectrum frequencies may include low-band frequencies, mid-band frequencies, and high-band frequencies. Different components or flight boxes and different cables may be used at different frequencies, which may help narrow down the component and/or cable where the inconsistency originates.

Data records 506 may include detailed built-in-test descriptions 530, data storage unit record code description documents 532, radio frequency cable interconnect diagrams 534, and/or any other suitable data source that may be used by built-in-test quick view tool 500. Detailed built-in-test descriptions 530 describe the detailed functional or performance parameters for each specific built-in-test number. Each built-in-test has a unique number, and each built-in-test number in turn has a detailed description in detailed built-in-test description 530.

Record code description documents 532 provide the key for interpreting data contained in data files extracted from a data storage unit, such as data 512. The data stored in the data storage unit files is organized by record codes. Data from each flight box contained in each aircraft, such as number of flight boxes 320 in aircraft 318 of FIG. 3 for example, may be stored in one or more record codes. The record code description documents identify how each record code can be interpreted. A record code description document may be, for example, without limitation, an Interface Control Document (ICD). The record code description documents describe how a mission computer on a vehicle records information to a data storage unit. Each version of a mission computer has its own specific record code description document that describes how that specific version of a mission computer writes information to a data storage unit. In an illustrative example, an Interface Control Document describes a prearranged set of data elements, related to a specific target system of interest, that were intended to be written to the data storage unit of a vehicle when the target system was added to the vehicle.

Other possible data elements may also be present outside the prearranged set of data elements that were determined by the mission computer to be unnecessary or not critical to capture in the data storage unit.

The description of how information is recorded by a mission computer onto a data storage unit provides the capability for filtering out, or masking, information that is not of interest to built-in-test quick view tool 500. As a result, the desired information about the target system of interest can be located, selected, and formatted using the record code description document associated with the mission computer for the vehicle. In an illustrative example, a record code description document in record code description documents 532 may be associated with the version of mission computer 323 in aircraft 318 of FIG. 3. The record code description document may describe how mission computer 323 recorded operational information about number of systems 319 of aircraft 318. The description of how mission computer 323 recorded operational information may then be used by built-in-test quick view tool 500 to locate and select data of interest about target system 321 in FIG. 3, for example.

Radio frequency cable interconnect diagrams 534 contain a number of diagrams depicting a number of interconnections in a vehicle between a number of flight boxes and a number of cables, such as number of flight boxes 312 and number of cables 314 in FIG. 3, for example. These diagrams provide a reference depicting how radio frequency signals flow between modules in a system, such as number of flight boxes 320 in FIG. 3, or throughout an aircraft, such as aircraft 318 in FIG. 3, for example.

Data selection process 508 may open data 512 and extract data of interest using record code description documents 532. Data 512 may be an example of data 330 in FIG. 3. Data 512 may be data pulled from data warehouse 306 in FIG. 3, for example. Data 512 contains operational information about a vehicle, including information about the target system of interest.

Information about the target system of interest may include, without limitation, information such as built-in-test data 513, discrete data, and/or any other suitable information of interest. In an illustrative example, wheels up data may be discrete data stored in a record code of data 512. In this illustrative example, this discrete data may be used by built-in-test quick view tool 500 to determine where an inconsistency occurred, during flight versus while the aircraft is on the ground, for example. The selected data may be used by number of modules 502 and cable tools 504. Built-in-test data 513 may also be displayed using user interface 510.

In an illustrative example, built-in-test quick view tool 500 may display selected data in a graphical display which is formatted in a way so that a user can view the selected data and determine where inconsistencies in the target system may exist. The user makes this determination based on their experience and knowledge of the target system and on the formatted built-in-test evidence presented by built-in-test quick view tool 500.

The illustration of built-in-test quick view tool 500 in FIG. 5 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 6:
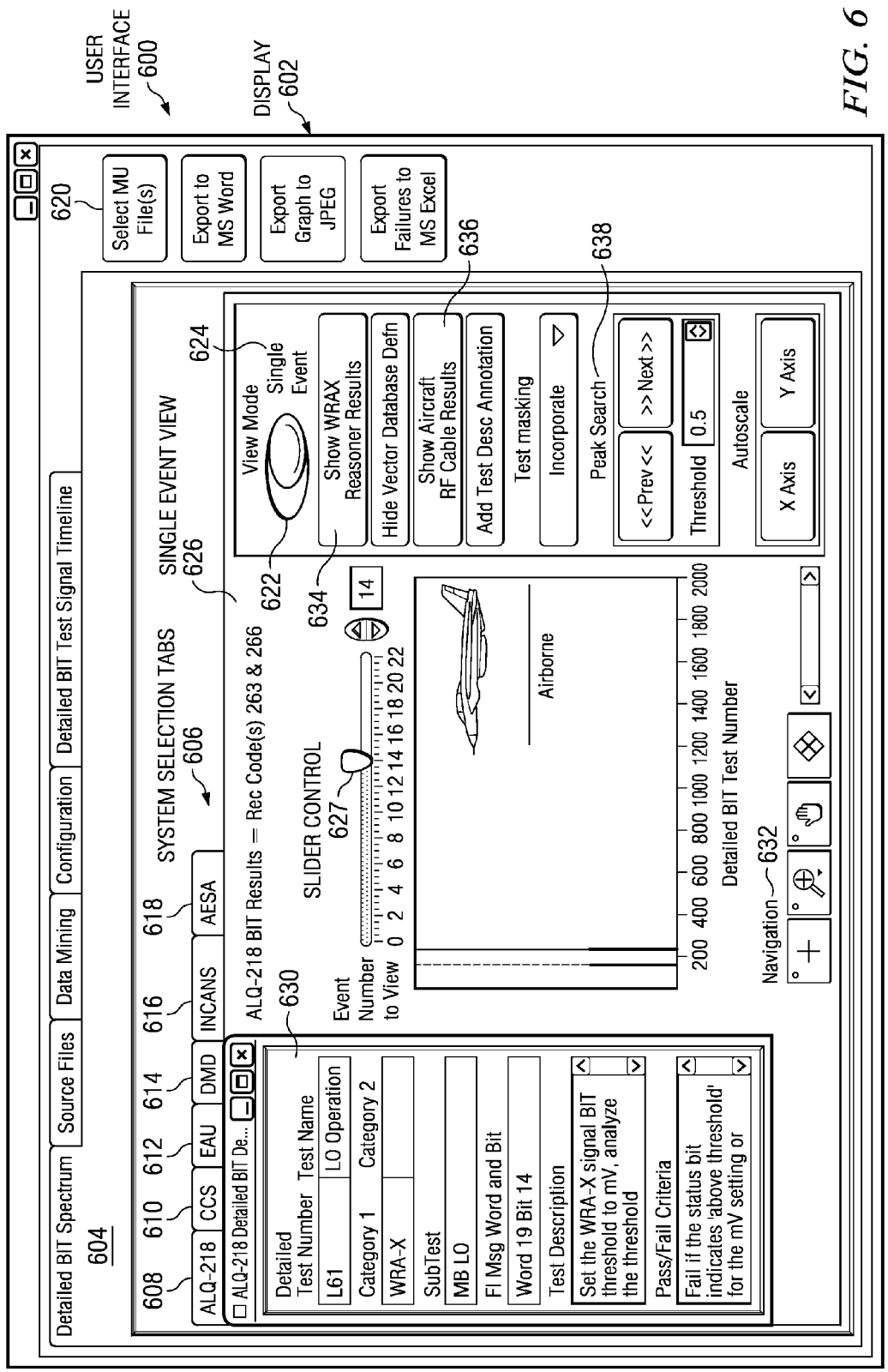
FIG. 6 is an illustration of a user interface in accordance with an illustrative embodiment.

With reference now to FIG. 6, an illustration of a user interface is depicted in accordance with an illustrative embodiment. User interface 600 may be one implementation of user interface 334 in FIG. 3 and/or user interface 510 in FIG. 5.

User interface 600 may be used to display or present information and allow interaction with a built-in-test quick view tool, such as built-in-test quick view tool 500 in FIG. 5. User interface 600 may include display 602, which may be an example of one implementation of display 414 in FIG. 4.

Display 602 may present detailed built-in-test spectrum 604. Detailed built-in-test spectrum 604 may be an example of one implementation of detailed built-in-test spectrum module 514 in FIG. 5. Detailed built-in-test spectrum 604 may include a number of system selection tabs 606 which provide capabilities for choosing a system of interest, or target system, such as target system 321 in FIG. 3, for example. System selection tabs 606 may include a number of different systems, such as, for example, without limitation, EA-18G electronic warfare system (ALQ-218) 608, communications countermeasures system (CCS) 610, electronic attack unit (EAU) 612, digital memory device (DMD) 614, interference noise cancellation system (INCANS) 616, advanced electronically scanned array (AESA) 618, and/or any other suitable system.

Once a system of interest, or target system, has been selected using system selection tabs 606, data files may be imported into detailed built-in-test spectrum 604 using select memory unit file(s) 620. Select memory unit file(s) 620 may provide the capabilities for searching a memory unit data warehouse, such as data warehouse 306 in FIG. 3 for example, to select one or more data files from number of data files 328. This selected data is then displayed in detailed built-in-test spectrum 604 using user interface 600.

View mode 622 may provide capabilities for selecting how the information, displayed in detailed built-in-test spectrum 604, is presented or viewed. One or more target system inconsistency events may occur during the time that power is applied to a vehicle, such as aircraft 318 in FIG. 3 for example. An inconsistency event is an inconsistency that is recorded or logged by a data storage unit during the time that power is applied to a vehicle. A target system inconsistency event may be, for example, without limitation, a component operating out of tolerance for a time segment during the time that power is applied to a vehicle. Each occurrence of an inconsistency is recorded as a numbered inconsistency time sequenced event by the target system. Those numbered inconsistency events can be displayed in summary view mode, where all of the inconsistency events are simultaneously displayed, or in single event mode where each numbered inconsistency event is displayed individually. In this illustrative example, view mode 622 is set to single event mode 624. Single event mode 624 provides single event view 626. Single event view 626 allows for the selection of a specific, individual event using slider control 627 to select the event by the chronologically logged event time stamp. The selected event is then displayed with detailed built-in-test information 630 corresponding to the selected event provided as well. Navigation 632 may be used to further navigate the information displayed in detailed built-in-test spectrum 604. Navigation 632 may provide capabilities for selecting an area or item to zoom in, zoom out, move information within the display, and/or any other suitable navigation functions.

Additional detailed information may be accessed within detailed built-in-test spectrum 604, such as, without limitation, flight box reasoner results 634 and aircraft radio frequency cable results 636, for example. Peak search buttons 638 may also be used to move along the peaks in the spectrum plot to ease navigation.

The illustration of user interface 600 in FIG. 6 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 7:
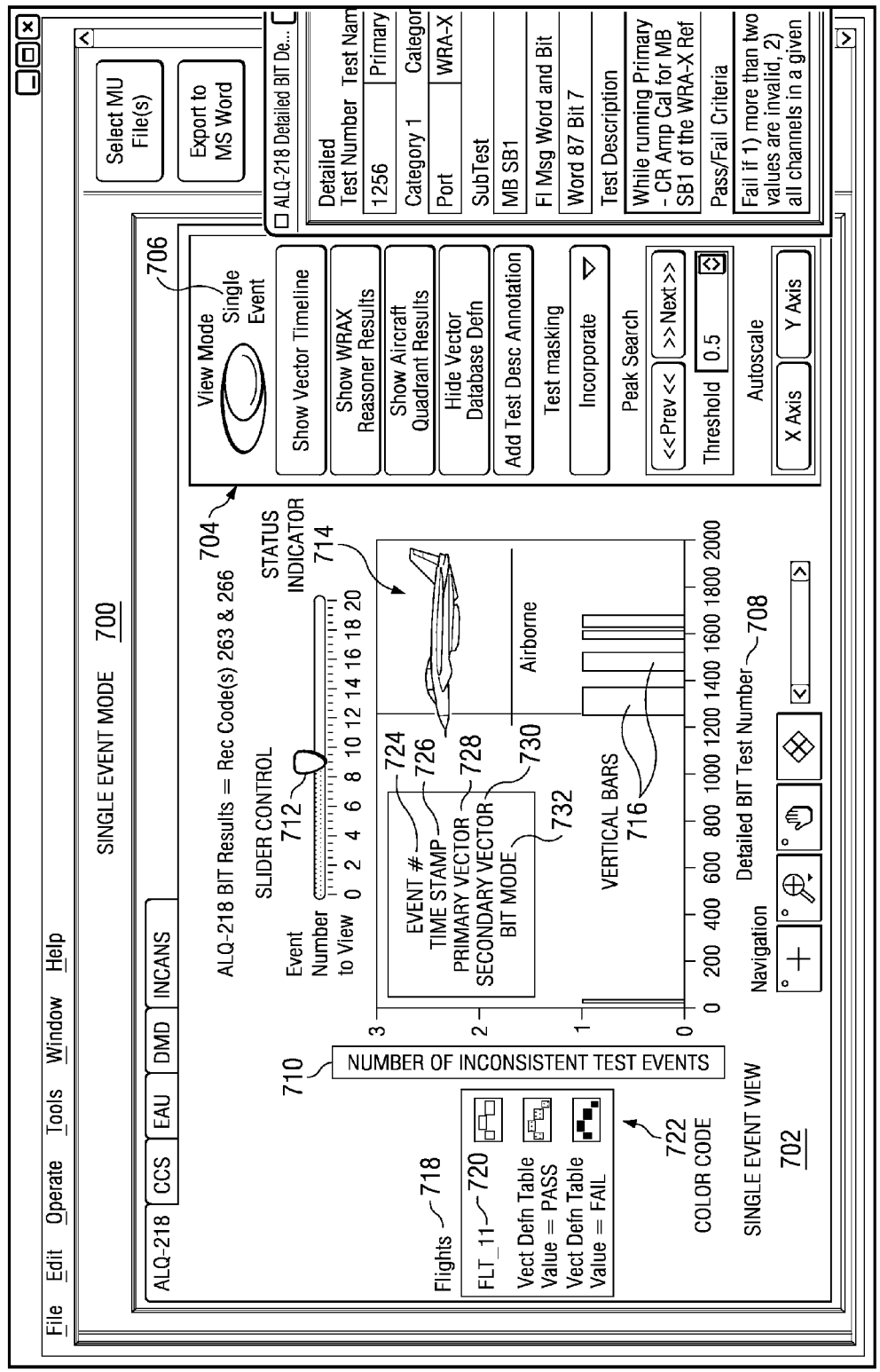
FIG. 7 is an illustration of a single event mode in accordance with an illustrative embodiment.

With reference now to FIG. 7, an illustration of a single event mode is depicted in accordance with an illustrative embodiment. Single event mode 700 may be an illustrative example of one implementation of single event 624 selection of view mode 622 in FIG. 6.

Single event mode 700 may display information in single event view 702. View mode 704 may be set to single event 706. Single event view 702 provides a display with detailed built-in-test number 708 along the x-axis and number of inconsistent test events 710 along the y-axis. Slider control 712 may provide capabilities for selecting a specific event by built-in-test number to view within single event view 702. In an illustrative example of an aircraft, status indicator 714 may display an indication of whether the aircraft was airborne or on the ground at the time the specific event being displayed occurred. Vertical bars 716 may indicate the detailed built-in-test number 708 where inconsistencies occurred, and the height of vertical bars 716 indicates the number of times the inconsistency occurred with that built-in-test number, charted using number of inconsistent test events 710.

On occasion, it may be advantageous to look at the data from multiple flights simultaneously. When multiple source files are loaded simultaneously, it may be necessary to be able to discriminate between the data from each flight. The built-in-test quick view tool accommodates this discrimination need using a different color to display the data from each file. The color code 722 legend is included on the left side of the flight histogram display to indicate which colors represent which flight. Vertical bars 716 may be color coded to identify the specific flight number during which the inconsistency with the built-in-test number occurred. Flights 718 may display the flight or number of flights to which the data pertains. For example, flight_11 720 may correspond with the color white, and a different flight might correspond with the color green.

Other detailed information about a selected event that may be displayed in single event view 702 may include the inconsistency event number 724, date-time stamp 726, primary vector 728, secondary vector 730, and built-in-test mode 732. Date-time stamp 726 is a formatted indicator which details specifically when an inconsistency event occurred. Primary vector 728 is a coded indicator that defines the first most likely specific system inconsistency type. Secondary vector 730 is a coded indicator that defines the second most likely specific system inconsistency type. Built-in-test mode 732 indicates which built-in-test mode is associated with the specific inconsistency event being displayed. Three modes of built-in-test may exist in an aircraft. S-BIT or start-up built-in-test runs immediately when power is applied to the aircraft. P-BIT or periodic built-in-test runs periodically after S-BIT completes. I-BIT or initiated built-in-test runs on operator command only. All three built-in-test modes run the same tests, however P-BIT uses less stringent tolerances than S-BIT or I-BIT.

The illustration of single event mode 700 in FIG. 7 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

With reference now to FIG. 8, an illustration of a flight histogram summary mode is depicted in accordance with an illustrative embodiment. Flight histogram summary mode 800 may be an illustrative example of another mode capable of being selected by view mode 622 in FIG. 6.

Flight histogram summary mode 800 displays information in flight histogram view 802. View mode 804 may be used to select flight histogram 806. Similar to single event view mode 700 in FIG. 7, flight histogram summary mode 800 provides a chart for information display that includes detailed built-in-test number 808 along the x-axis and a cumulative summary number of inconsistent test events 810. Flight histogram summary mode 800 provides a summary view of all built-in-test inconsistencies that occurred during the period of time that the operational data was captured by a data storage unit, such as data storage unit 324 in FIG. 3, for example. Slider control 812 may not be used in flight histogram view 802.

Test number cursor 814 or peak search buttons 815 may be used to highlight a specific built-in-test number and obtain details about the specific built-in-test, such as detailed built-in-test description information from detailed built-in-test descriptions 530 in FIG. 5, for example. Built-in-test numbers that have been masked, or intentionally ignored via filtering, may also be highlighted on flight histogram view 802. A built-in-test number may be masked by a vehicle system computer during collection of operational data by a data storage unit. Built-in-test quick view tool 500 in FIG. 5 may be capable of displaying all built-in-test results regardless of whether or not a vehicle system filtered the test result during operation, in order to provide a user analyzing built-in-test data all recorded information.

Vertical bars 816 represent the built-in-test numbers where an inconsistency has occurred and the number of times the inconsistency has occurred. Vertical bars 816 may be color coded to identify the specific flight number during which the inconsistency with the built-in-test number occurred. Flights 818 may display the flight or number of flights to which the data pertains. For example, flight_10 820 may correspond with color code 822, and vertical bars 816 may be displayed with a different color code 822 to indicate the inconsistency noted for the built-in-test number occurred during a different flight.

The illustration of flight histogram summary mode 800 in FIG. 8 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 9:
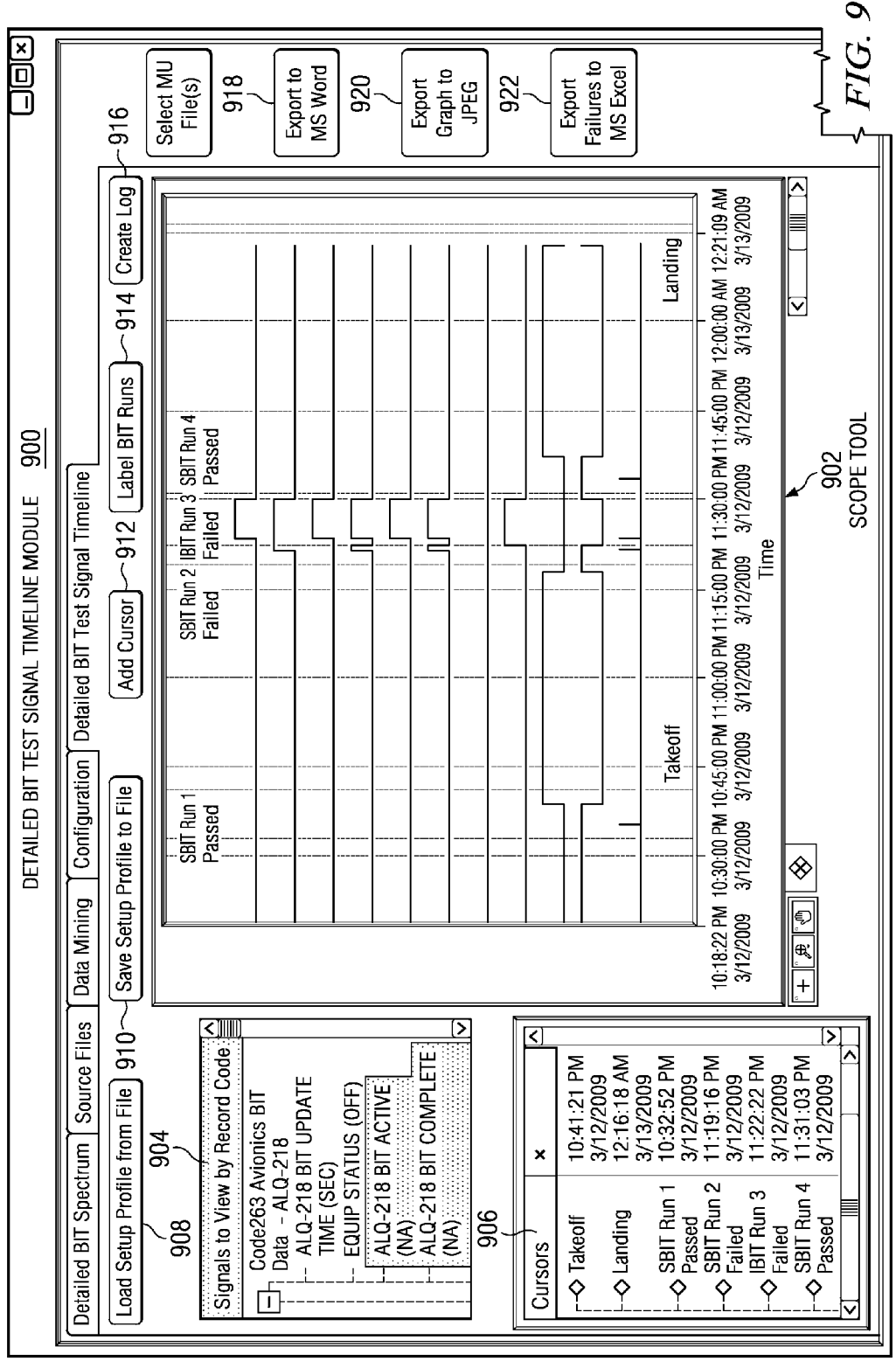
FIG. 9 is an illustration of a detailed built-in-test test signal timeline module in accordance with an illustrative embodiment.

With reference now to FIG. 9, an illustration of a detailed built-in-test test signal timeline module is depicted in accordance with an illustrative embodiment. Detailed built-in-test test signal timeline module 900 may be an example of one implementation of detailed built-in-test signal timeline module 522 in FIG. 5.

Detailed built-in-test signal timeline module 900 may include scope tool 902. Scope tool 902 may an example of one implementation of scope tool 524 in FIG. 5. Scope tool 902 provides for capabilities to observe a time indexed display of discrete signals from the target system. These discrete signals are captured and stored in the operational data files for the system. Detailed built-in-test test signal timeline module 900 may include selection options such as, without limitation, signals to view by record code 904 and cursors 906. Signals to view by record code 904 allows for the selection of specific discrete signals to view using scope tool 902. Cursors 906 consist of a vertical line which assists a user to see which discrete signal transitions are aligned on the scope tool display.

Scope tool 902 may also provide for a number of data manipulation functions to assist in analysis of the discrete signals being viewed. For example, without limitation, functions may include load setup profile from file 908, save setup profile to file 910, add cursor 912, label built-in-test runs 914, create log 916, and/or any other suitable functions. For example, create log 916 may be used to save a selection of discrete signals being viewed for future reference. In addition, scope tool 902 provides capabilities to export to Microsoft® Word 918, export graph to JPEG 920, and export failures to Microsoft® Excel® 922. Microsoft and Excel are registered trademarks of Microsoft Corporation in the United States and/or other countries.

The illustration of detailed built-in-test test signal timeline module 900 in FIG. 9 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 10:
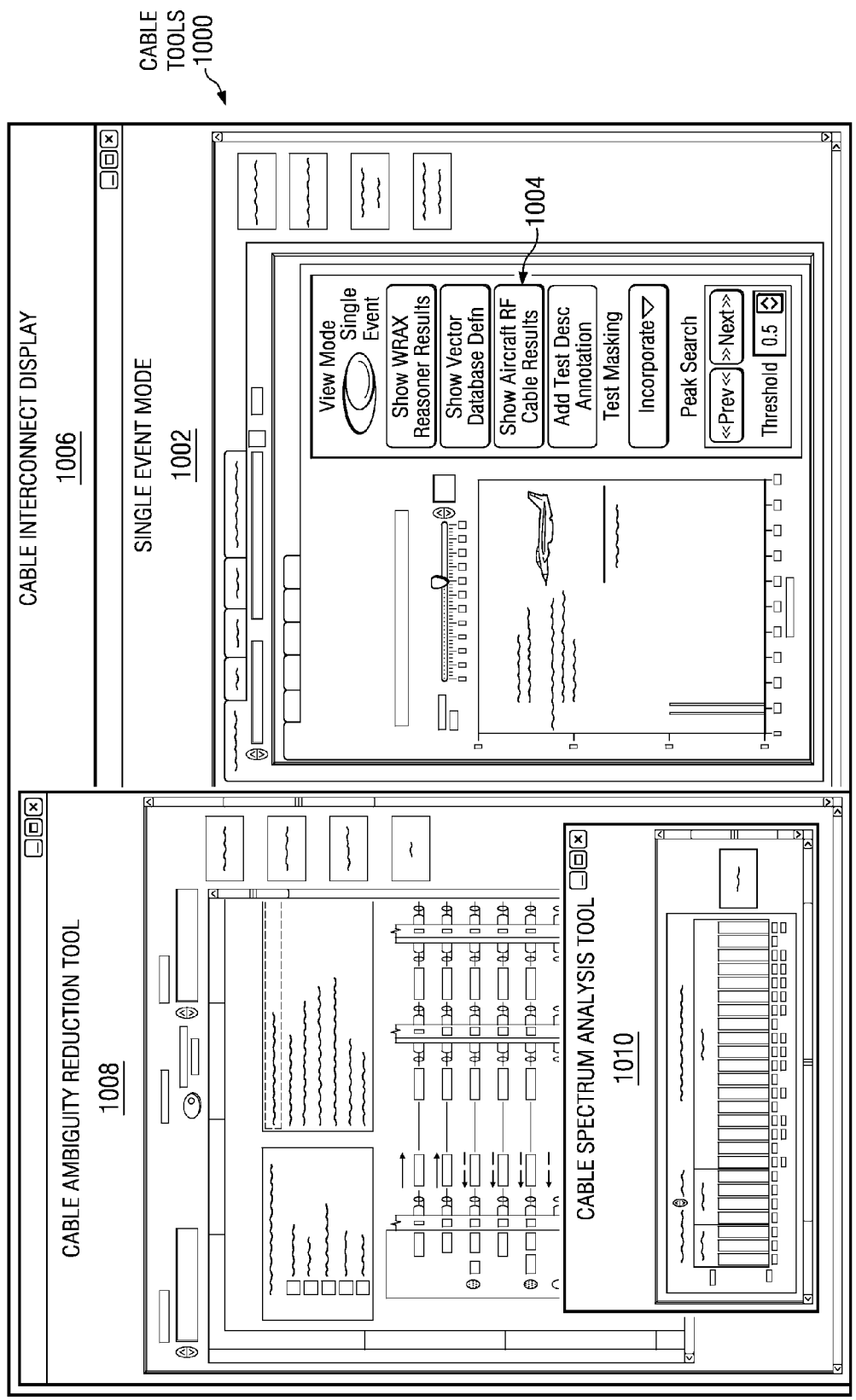
FIG. 10 is an illustration of cable tools in accordance with an illustrative embodiment.

With reference now to FIG. 10, an illustration of cable tools is depicted in accordance with an illustrative embodiment. Cable tools 1000 may be an example of one implementation of cable tools 338 in FIG. 3 and/or cable tools 504 in FIG. 5.

Cable tools 1000 may be used during single event mode 1002, for example. In single event mode 1002, a selection may be made to show aircraft radio frequency cable test results 1004. This selection initiates the cable interconnect display 1006. Cable interconnect display 1006 may display cable ambiguity reduction tool 1008 and cable spectrum analysis tool 1010. Cable ambiguity reduction tool 1008 may be an example of one implementation of cable ambiguity reduction tool 526 in FIG. 5. Cable spectrum analysis tool 1010 may be an example of one implementation of cable spectrum analysis tool 528 in FIG. 5.

The illustration of cable tools 1000 in FIG. 10 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 11:
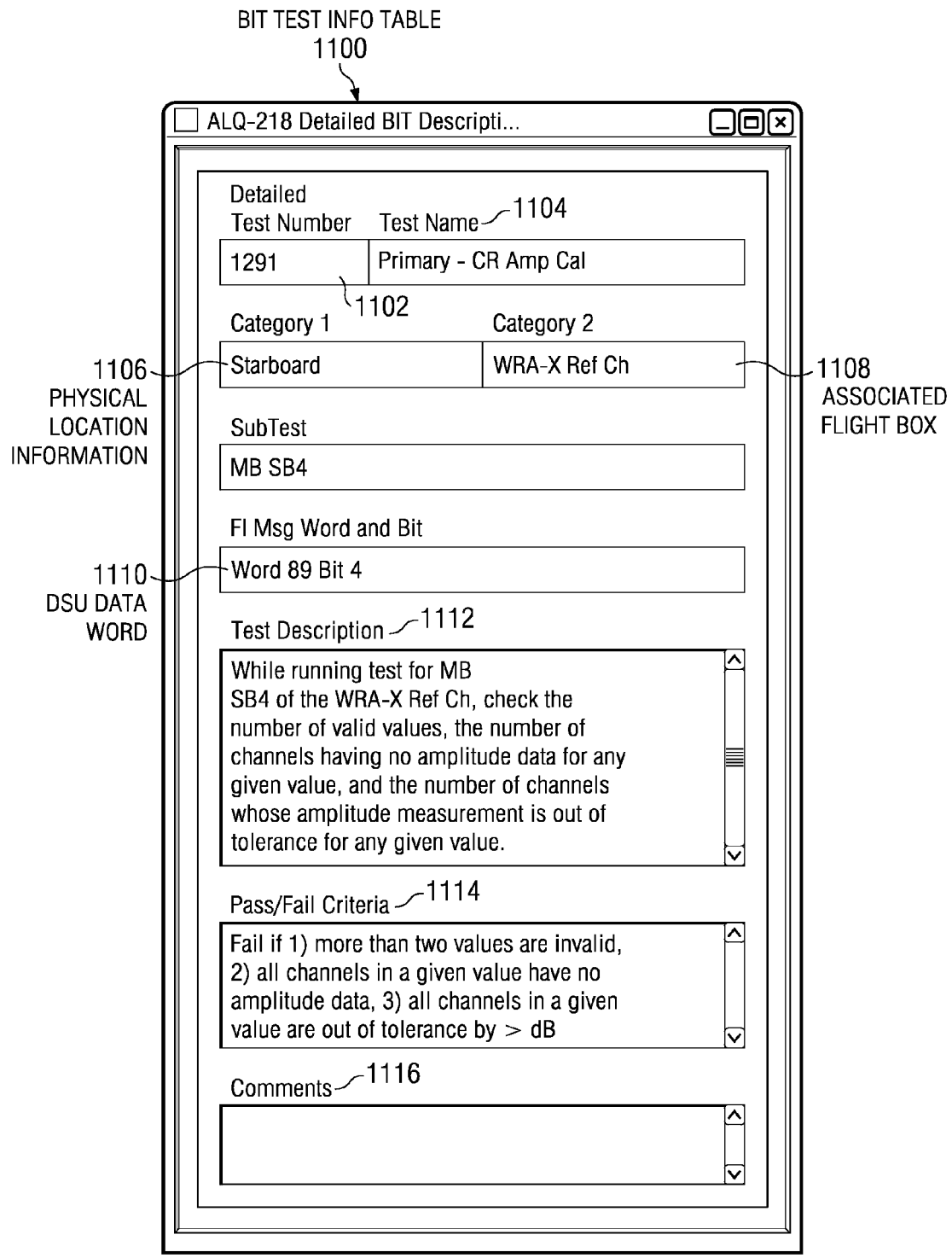
FIG. 11 is an illustration of a built-in-test test information table in accordance with an illustrative embodiment.

With reference now to FIG. 11, an illustration of a built-in-test test information table is depicted in accordance with an illustrative embodiment. Built-in-test test information table 1100 may be an example of one implementation of built-in-test description 630 in FIG. 6.

Built-in-test test information table 1100 may provide detailed information about a specific built-in-test number. Built-in-test test information table 1100 may include data fields such as, without limitation, test number 1102, test name 1104, physical location information 1106, associated flight box 1108, data storage unit data word 1110, test description 1112, pass/fail criteria 1114, comments 1116, and/or any other suitable data field. Test number 1102 may display the detailed built-in-test number that corresponds to the detailed information being presented in built-in-test test information table 1100. Test name 1104 may present the name of the test associated with the detailed built-in-test number. Location 1106 may provide the general location or area in which the component or cable subject to the specific detailed built-in-test is located within a vehicle. Associated flight box 1108 may provide the specific component that is subject to the specific detailed built-in-test that is displayed.

Data storage unit data word 1110 may provide the data record that contains the test results for the detailed built-in-test number. Test description 1112 may provide a description of the test that is performed by a specific built-in-test number. Pass/fail criteria 1114 may provide a description of the test criteria associated with the built-in-test number.

The illustration of built-in-test test information table 1100 in FIG. 11 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 12:
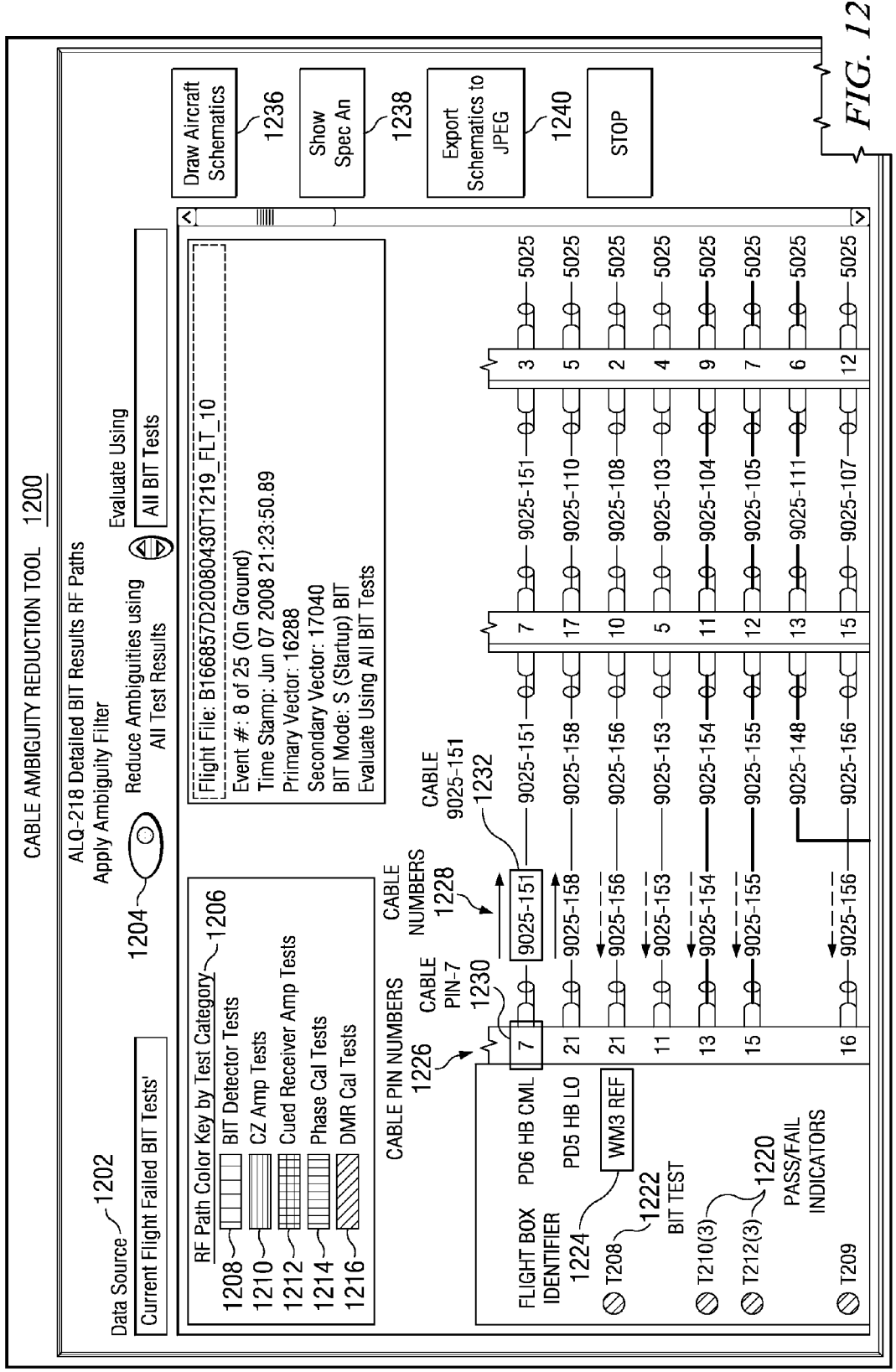
FIG. 12 is an illustration of a cable ambiguity reduction tool in accordance with an illustrative embodiment.

With reference now to FIG. 12, an illustration of a cable ambiguity reduction tool is depicted in accordance with an illustrative embodiment. Cable ambiguity reduction tool 1200 may be an example of one implementation of cable ambiguity reduction tool 526 in FIG. 5.

Cable ambiguity reduction tool 1200 may present information from a data source 1202. Cable ambiguity reduction tool 1200 uses built-in-test failure data to indict a superset of radio frequency cables that may be related to an inconsistency event. Once the superset of radio frequency cables have been identified, cable ambiguity reduction tool 1200 may reduce ambiguities using all test results 1204. All test results may refer to the built-in-test results. The built-in-test results that passed may be used to absolve a sub-set of those indicted cables. By reducing ambiguities using all test results 1204, cable ambiguity reduction tool 1200 may reduce the total number of candidate "bad" cables that need to be analyzed and/or inspected for inconsistencies.

Cable ambiguity reduction tool 1200 highlights a radio frequency cable schematic in color using radio frequency path color key by test category 1206. Radio frequency path color key by test category 1206 shows the set of cables that have been indicted in a color coded manner. Radio frequency path color key by test category 1206 may include built-in-test detector tests 1208, channelized encoder tests 1210, cued receiver amp tests 1212, phase cal tests 1214, and digital measuring receiver cal tests 1216.

Cable ambiguity reduction tool 1200 displays indicted cables with information such as pass/fail indicators 1220, built-in-test numbers 1222, flight box identifier 1224, cable pin numbers 1226 and cable numbers 1228. In an illustrative example, cable pin-7 1230 is associated with cable number 9025-151 1232. Cable ambiguity reduction tool 1200 provides information about the flight box or component associated with cable number 9025-151 1232, a built-in-test number associated with cable number 9025-151 1232, and whether a specific built-in-test number associated with cable number 9025-151 1232 passed or failed.

This radio frequency schematic can be annotated using draw aircraft schematic 1236. Once an aircraft schematic is drawn, a user may choose to launch a pop up tool to view the individual cable test results by selecting show spec analysis 1238. Show spec analysis 1238 presents the results of the built-in-tests related to a specific cable, which indicates whether an inconsistency impacts a specific frequency band or all frequencies. The annotated radio frequency schematic can be exported using export schematic to JPEG 1240.

The illustration of cable ambiguity reduction tool 1200 in FIG. 12 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 13:
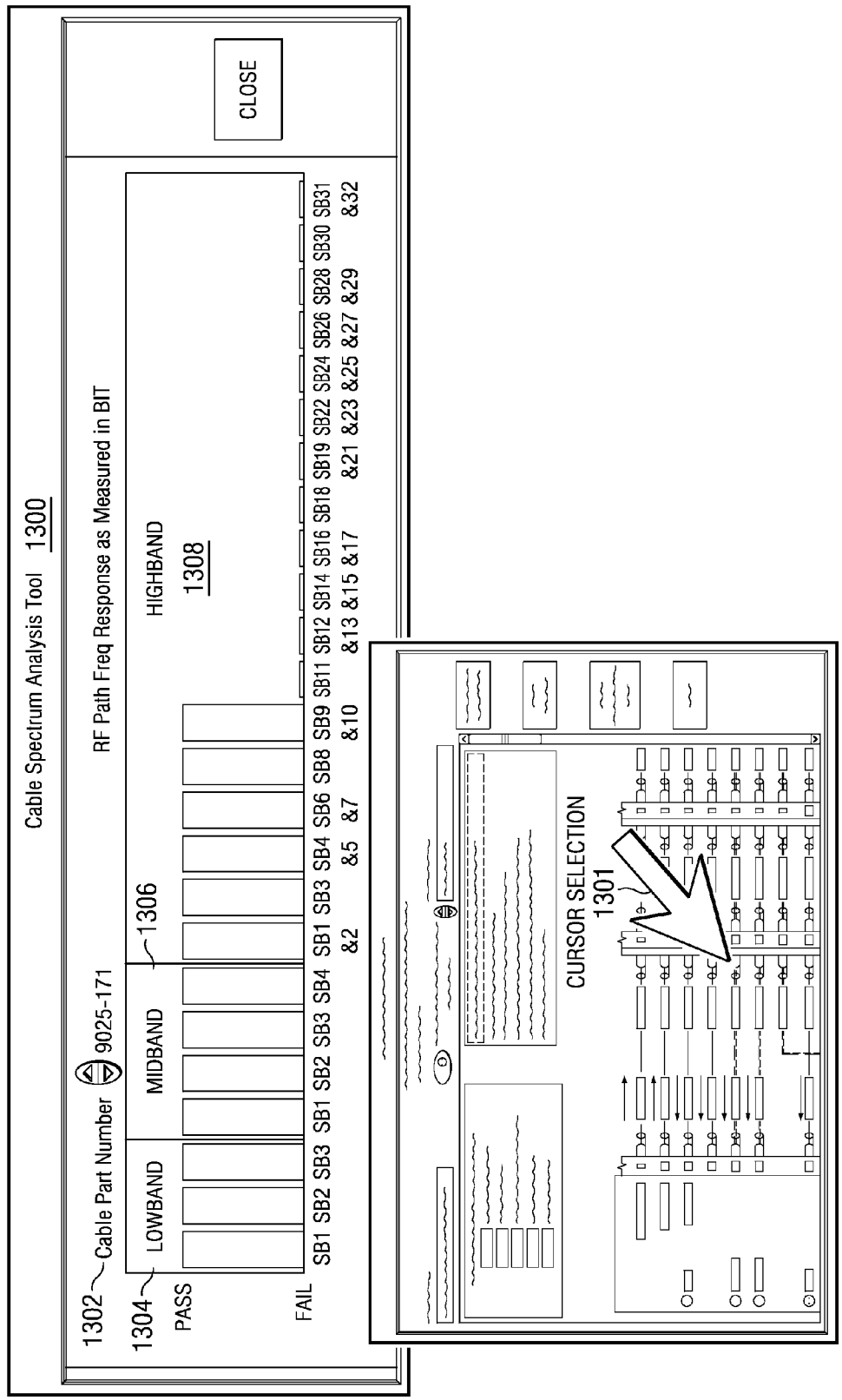
FIG. 13 is an illustration of a cable spectrum analysis tool in accordance with an illustrative embodiment.

With reference now to FIG. 13, an illustration of a cable spectrum analysis tool is depicted in accordance with an illustrative embodiment. Cable spectrum analysis tool 1300 may be an example of one implementation of cable spectrum analysis tool 528 in FIG. 5.

Cable spectrum analysis tool 1300 may be available when cable ambiguity reduction tool 1200 has been selected. Cable spectrum analysis tool 1300 may be used to view each individual cable that has been indicted as potentially problematic using cursor selection 1301. Cable spectrum analysis tool 1300 provides capabilities for determining whether the potential inconsistency is related to all radio frequencies or just a certain band of frequencies. Cable spectrum analysis tool 1300 may provide cable part number 1302. Cable spectrum analysis tool 1300 may provide detailed information about the frequencies which are related to the inconsistencies that have occurred, such as lowband 1304, midband 1306, and highband 1308, which will aid in further system inconsistency isolation. The information displayed by cable spectrum analysis tool 1300 is contained in built-in-test results data from data files, such as data 330 in FIG. 3, for example.

The illustration of cable spectrum analysis tool 1300 in FIG. 13 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 14:
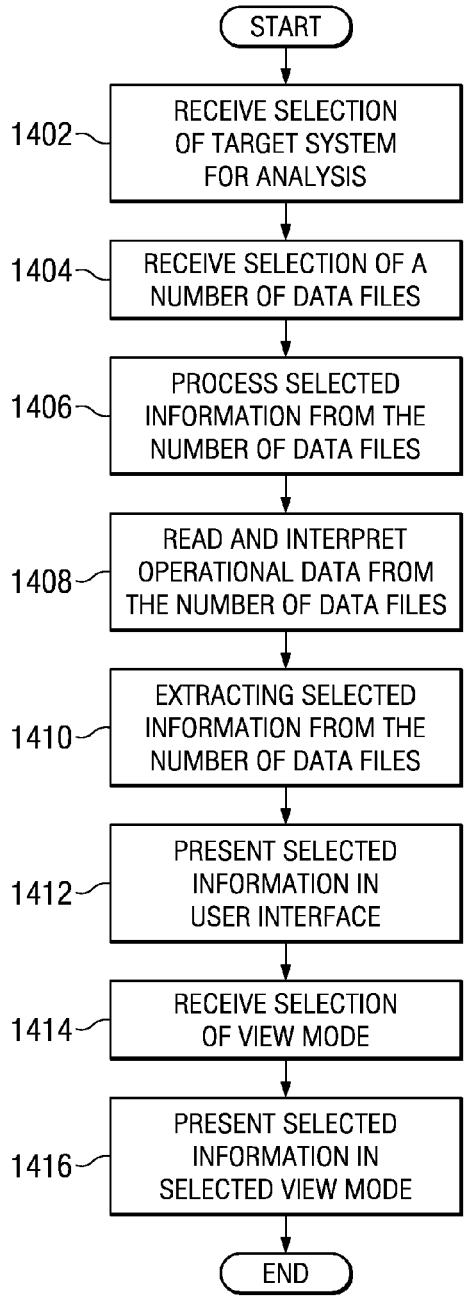
FIG. 14 is an illustration of a flowchart of a process for accessing built-in-test data in accordance with an advantageous embodiment.

With reference now to FIG. 14, an illustration of a flowchart of a process for accessing built-in-test data is depicted in accordance with an advantageous embodiment. The process in FIG. 14 may be implemented by a component such as built-in-test quick view tool 332 in FIG. 3.

The process begins by receiving selection of a target system for analysis (operation 1402). The target system may be selected from a number of systems, such as, for example, without limitation, electronic warfare system (EA-18G ALQ-218), communications countermeasures system (CCS), electronic attack unit (EAU), digital memory device (DMD), interference noise cancellation system (INCANS), advanced electronically scanned array (AESA), and/or any other suitable system.

The process then receives selection of a number of data files (operation 1404) to load into the built-in-test quick view tool. The number of data files may be files stored in a data warehouse, such as number of data files 328 in data warehouse 306 of FIG. 3. The number of data files may contain operational data for a vehicle, including built-in-test results captured during recordation by a data storage unit, such as data storage unit 324 in FIG. 3. The vehicle may be, for example, an aircraft such as aircraft 318 in FIG. 3. The number of data files stored in data warehouse 306 in FIG. 3 may contain operational data for a number of vehicles and/or a number of different systems, such as number of systems 310 in FIG. 3.

The process then processes selected information from the number of data files (operation 1406). Processing the selected information may include reading, interpreting, and extracting selected information, for example, based on the selected target system or number of systems selected for analysis. The process reads and interprets operational data from the number of data files (operation 1408). The process may use a data interpretation process, such as data interpretation process 536 in FIG. 5, for example.

The process then extracts the selected information from the number of data files (operation 1410). The selected information is data about the target system of interest. Operational data for a vehicle may include built-in-test data, additional data of interest, and other data which is not useful for diagnostic analysis. The process may use data selection process, such as data selection process 508 in FIG. 5, to select, or extract, information about the target system of interest for built-in-test data analysis. Selected information may be, without limitation, built-in-test results and other data of interest. This selected information can then be presented for analysis using a built-in-test quick view tool. The process then presents the selected information in a user interface (operation 1412). The user interface may include, for example, detailed built-in-test spectrum display 604 of FIG. 6, for example.

The process receives selection of a view mode (operation 1414). The view mode may be selectable by a user over the user interface. The view mode selection may include, without limitation, single event view mode and flight histogram summary view mode. The process then presents the selected information in the selected view mode (operation 1416), with the process terminating thereafter.

Figure 15:
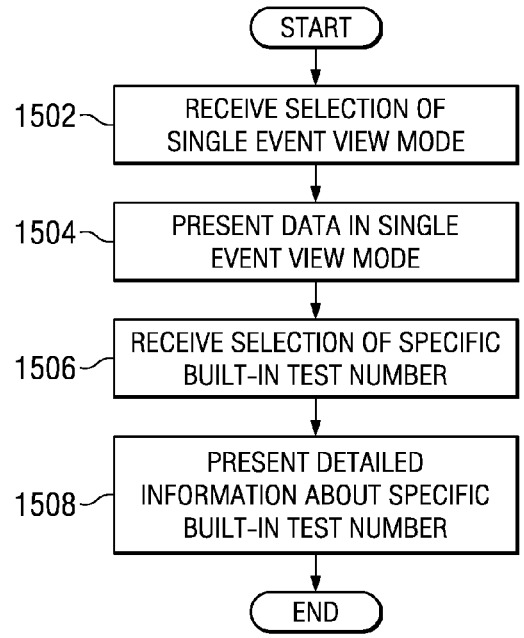
FIG. 15 is an illustration of a flowchart of a process for presenting detailed built-in-test test data in accordance with an advantageous embodiment.

With reference now to FIG. 15, an illustration of a flowchart of a process for presenting detailed built-in-test test data is depicted in accordance with an advantageous embodiment. The process in FIG. 15 may be implemented by a component such as built-in-test quick view tool 332 in FIG. 3.

The process begins by receiving a selection of a single event view mode (operation 1502). The single event view mode may be, for example, single event mode 700 in FIG. 7. The process presents data in the single event view mode (operation 1504). The process next receives a selection of a specific built-in-test number (operation 1506). The process presents detailed information about the specific built-in-test number (operation 1508), with the process terminating thereafter.

Figure 16:
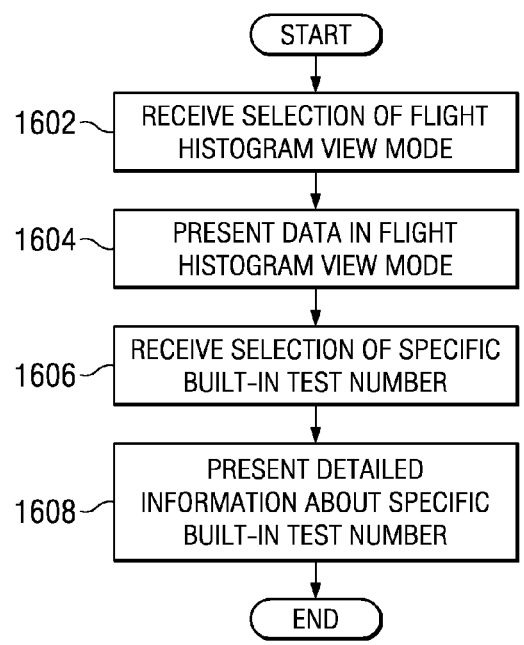
FIG. 16 is an illustration of a flowchart of a process for presenting detailed built-in-test test data in accordance with an advantageous embodiment.

With reference now to FIG. 16, an illustration of a flowchart of a process for presenting detailed built-in-test test data is depicted in accordance with an advantageous embodiment. The process in FIG. 16 may be implemented by a component such as built-in-test quick view tool 332 in FIG. 3.

The process begins by receiving a selection of a flight histogram view mode (operation 1602). The flight histogram view mode may be, for example, flight histogram summary mode 800 in FIG. 8. The process presents data in the flight histogram view mode (operation 1604). The process next receives a selection of a specific built-in-test number (operation 1606). The process presents detailed information about the specific built-in-test number (operation 1608), with the process terminating thereafter.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a number of data storage units engaged in a vehicle and configured to receive and store data from a number of computers aboard the vehicle, each of the number of computers operably coupled to a different subsystem of the vehicle, wherein the data comprises information about operation of the vehicle generated while the vehicle is in operation and the number of computers are receiving power;
    a data extraction tool stored in one or more computer-readable storage devices and configured to extract the data from the number of data storage units;
    a data warehouse stored in one or more computer-readable storage devices and having a number of data files comprising the data extracted from the number of data storage units;
    a data processing system including one or more processors, one or more computer readable memories, and the one or more computer-readable storage devices;
    computer program instructions stored in the one or more computer-readable storage devices for execution by the one or more processors via the one or more computer-readable memories for aggregating a set of cable data into an aggregated list, each cable data in the set having an associated built-in-test inconsistency data; and
    computer program instructions stored in the one or more computer-readable storage devices for execution by the one or more processors via the one or more computer-readable memories for modifying the aggregated list into an indicted list by eliminating from the aggregated list each cable data in the set of cable data having a built-in-test passed indication.

2. The apparatus of claim 1, wherein the number of data storage units comprise operational data for the vehicle.

3. The apparatus of claim 2, wherein the vehicle is an aircraft.

4. The apparatus of claim 1, wherein the number of data files comprise operational data for a number of systems.

5. The apparatus of claim 1, further comprising:
computer program instructions stored in the one or more computer-readable storage devices for execution by the one or more processors via the one or more computer-readable memories for processing selected data for a number of selected systems from the number of data files using a number of record code description documents, wherein each of the number of record code description documents are associated with one of the number of computers and describe how the one of the number of computers recorded information about a particular system of the vehicle while the vehicle was in operation; wherein the selected data comprises built-in-test data for the number of selected systems.

6. The apparatus of claim 1, wherein the data processing system is further configured to:
computer program instructions stored in the one or more computer-readable storage devices for execution by the one or more processors via the one or more computer-readable memories for reading the data stored on the number of data files; and
computer program instructions stored in the one or more computer-readable storage devices for execution by the one or more processors via the one or more computer-readable memories for interpreting the data using a number of record code description documents;
computer program instructions stored in the one or more computer-readable storage devices for execution by the one or more processors via the one or more computer-readable memories for displaying a cable data from the indicted list in a schematic that shows a pass-fail indicator, a built-in-test number, and a cable number;
computer program instructions stored in the one or more computer-readable storage devices for execution by the one or more processors via the one or more computer-readable memories for determining that a potential inconsistency reflected in the cable data is related to one of all radio frequencies and certain band of radio frequencies; and
computer program instructions stored in the one or more computer-readable storage devices for execution by the one or more processors via the one or more computer-readable memories for providing information about frequencies related to the potential inconsistency.

7. The apparatus of claim 6, wherein the data processing system is further configured to:
extract selected data from the number of data files.

8. A method for accessing operational data for a vehicle, the method comprising:
recording data using a number of data storage units engaged in the vehicle and configured to receive and store data from a number of computers aboard the vehicle, each of the number of computers operably coupled to a different subsystem of the vehicle, wherein the data comprises information about operation of the vehicle generated while the vehicle is in operation and the number of computers are receiving power;
removing the data storage units from the vehicle;
stripping the data from the data storage units by a data extraction tool;
storing the data in a number of data files in a data warehouse;
receiving from a user interface a selection of a target system from a number of subsystems of the vehicle;
receiving a selection of at least one of the number of data files stored in a data warehouse related to the target system;
aggregating a set of cable data into an aggregated list, each cable data in the set having an associated built-in-test inconsistency data; and
modifying the aggregated list into an indicted list by eliminating from the aggregated list each cable data in the set of cable data having a built-in-test passed indication.

9. The method of claim further comprising:
processing selected information from the at least one of the number of data files using a processor unit and a number of record code description documents, wherein each of the number of record code description documents are associated with one of the number of computers and describe how the one of the number of computers computer recorded information about a particular system of the vehicle while the vehicle was in operation; and
presenting the selected information using the user interface, wherein the selected information comprises the built-in-test data.

10. The method of claim 8, wherein processing the selected information from the number of data files further comprises:
reading data stored in the number of data files;
interpreting the data using a number of record code description document;
display a cable data from the indicted list in a schematic that shows a pass-fail indicator, a built-in-test number, and a cable number;
determine that a potential inconsistency reflected in the cable data is related to one of all radio frequencies and certain band of radio frequencies; and
provide information about frequencies related to the potential inconsistency.

11. The method of claim 10, further comprising:
extracting the selected information from the data stored in the number of data files.

12. The method of claim 10, wherein the data comprises operational data for the vehicle.

13. The method of claim 8, further comprising:
receiving a selection of a view mode; and
presenting selected information in the view mode selected.

14. The method of claim 13, wherein the view mode is selected from one of a single event view mode and a flight histogram summary view mode.

15. The method of claim 8, further comprising:
receiving a selection of a built-in-test number; and
presenting detailed information associated with the built-in-test number.

16. A computer program product comprising:
a non-transitory computer-readable storage medium;
program code, stored on the non-transitory computer readable storage medium, for accessing operational data recorded using a number of data storage units engaged in a vehicle and configured to receive and store data from a number of computers aboard the vehicle, each of the number of computers operably coupled to a different subsystem of the vehicle, wherein the data comprises information about operation of the vehicle generated while the vehicle is in operation and the number of computers are receiving power;
program code, stored on the non-transitory computer readable storage medium, for receiving a selection of a target system from a number of systems;
program code, stored on the non-transitory computer readable storage medium, for receiving a selection of a number of data files stored in a data warehouse;

program code stored on the non-transitory computer-readable storage medium, for aggregating a set of cable data into an aggregated list, each cable data in the set having an associated built-in-test inconsistency data; and program code stored on the non-transitory computer-readable storage medium for modifying the aggregated list into an indicted list by eliminating from the aggregated list each cable data in the set of cable data having a built-in-test passed indication.

17. The computer program product of claim 16, further comprising:

program code stored on the non-transitory computer-readable storage medium for processing selected data for a number of selected systems from the number of data files using a number of record code description documents, wherein each of the number of record code description documents are associated with one of the number of computers and describe how the one of the number of computers recorded information about a particular system of the vehicle while the vehicle was in operation; wherein the selected data comprises built-in-test data for the number of selected systems, and wherein the selected data comprises the built-in-test data.

18. The computer program product of claim 16, wherein processing the selected information from the number of data files further comprises:

program code, stored on the non-transitory computer readable storage medium, for reading data stored in the number of data files;

program code, stored on the non-transitory computer readable storage medium, for interpreting the data using the number of record code description documents;

program code stored on the non-transitory computer-readable storage medium for displaying a cable data from the indicted list in a schematic that shows a pass-fail indicator, a built-in-test number, and a cable number;

program code stored on the non-transitory computer-readable storage medium for determining that a potential inconsistency reflected in the cable data is related to one of all radio frequencies and certain band of radio frequencies: and program code stored on the non-transitory computer-readable storage medium for providing information about frequencies related to the potential inconsistency.

19. The computer program product of claim 18, further comprising:

program code, stored on the non-transitory computer readable storage medium, for extracting the selected information from the data stored in the number of data files.

20. The computer program product of claim 16, further comprising:

program code, stored on the non-transitory computer readable storage medium, for receiving a selection of a built-in-test number; and program code, stored on the non-transitory computer readable storage medium, for presenting detailed information associated with the built-in-test number.

\* \* \* \* \*